Patented Feb. 23, 1954

2,670,302

UNITED STATES PATENT OFFICE 2,670,302

STABILIZED CELLULOSE ESTER COMPOSITION AND PROCESS OF PREPARING IT

Carl J. Malm and Robert F. Williams, Rochester, N. Y., assignors to Eastman Kodak Company, Rochester, N. Y., a corporation of New Jersey No Drawing. Application November 15, 1949, Serial No. 127,515

14 Claims. (Cl. 106—176)

This invention relates to stabilized cellulose esters which have been stabilized by the addition thereto of a glycidyl ether.

Cellulose esters as prepared in the conventional manner from wood pulp or cotton linters tend to undergo discoloration and chain cleavage at high temperatures. Also, over long periods of time there may be evidence of deterioration of those esters. This is a decided disadvantage in the use of those esters, particularly in situations involving elevated temperatures, such as in molding, fabrics, etc., and, consequently, methods have been developed for stabilizing those esters against the effects of elevated temperatures.

One object of our invention is to prepare cellulose esters which retain color and chain length stability at temperatures which ordinarily cause discoloration and deterioration in cellulose esters. Another object of our invention is to provide a method of stabilizing cellulose esters using glycidyl ethers. Other objects of our invention will appear herein.

We have found that cellulose ester compositions which are stable at molding or ironing temperatures can be prepared from lower fatty acid esters of cellulose providing the sulfur in those esters which is ordinarily present as $SO_4$ radical is present only in a neutralized condition and, in addition, a stabilizing quantity of a glycidyl ether is also incorporated therein.

Our invention relates to lower fatty acid esters of cellulose containing one or more acetyl, propionyl, or butyryl radicals, which esters ordinarily have a sulfur content in the form of sulfate radical of .001 to .015%. We have found that in order to stabilize those esters in accordance with our invention it is necessary to have the sulfur, which is in the form of sulfur acid radicals, in the cellulose ester in a neutralized condition. This may be as a result of washing the cellulose ester with water having sufficient hardness to neutralize the sulfur acid radicals or if the ash content is low or is not of the type which will neutralize the sulfur acid radicals, by adding thereto metallic ion in a proportion at least chemically equivalent to the unneutralized sulfur acid radicals present in the cellulose ester. The neutralizing agent may be a metal salt of a weak acid, for example, potassium acid oxalate, aluminum formate, magnesium carbonate, calcium carbonate, sodium carbonate, sodium formate, potassium acid furmarate, or, for that matter, any suitable metal salt of a weak acid. Ordinarily, the heavy metal salts of weak acids are not particularly desirable in this connection due to the coloration which they impart. However, aluminum, zinc, or magnesium salts are useful in this connection because they are ordinarily characterized by lack of color in the form of their salts. Magnesium oxide or calcium or magnesium hydroxide may also be employed for this purpose, or even alkali metal hydroxides although if the latter, special care must be taken to avoid any appreciable hydrolysis of the cellulose ester. It is preferred not to use a large excess of the stabilizing salt as this has a tendency to discolor the composition. If, however, due to the conditions employed such an excess is present, such as a result of the high amount of temporary hardness in the washing water used, this tendency to discoloration can be reduced by adding a weak acid, such as oxalic, maleic, fumaric, or formic acid in an amount approximately equivalent to the stabilizing salt which is present. By thus treating the cellulose ester any tendency to discoloration is inhibited.

The stabilizing material which is employed in compositions in accordance with our invention are the glycidyl ethers. Some of the glycidyl ethers which are useful for stabilizing purposes in accordance with our invention are the mono- or di-glycidyl ethers of hydroquinone, the glycidyl ethers of resorcinol, the glycidyl ether of phenol, the 2-methyl glycidyl ether of phenol, p-phenyl glycidoxy benzene, the glycidyl ether of beta-naphthol, cyclohexyl glycidyl ether, n-hexyl glycidyl ether, 2-ethyl hexylglycidyl ether, p-tertiary amyl phenyl glycidyl ether, bis (p,p diglycidoxy diphenyl) ethane, and the like. When one of these ethers is incorporated into a cellulose ester, the sulfur acid radicals of which is in neutralized condition, the cellulose ester is not only stabilized to temperatures, such as 200–205° C. such as are commonly employed in testing heat stability of cellulose esters but, also, exhibit good resistance to the effects of temperatures of 225–250° C. or more, such as might be met with in practical operations, such as molding, ironing, lighting systems and the like. For instance, compositions in accordance with our invention can be subjected to elevated temperatures for prolonged periods of time without showing any deterioration. An advantage of the type of stabilizer which is employed in our compositions is that it may be used in any desired concentration without producing haze or discoloration in such a composition. These glycidyl ethers are well known at the present time. For instance, the di-glycidyl ether of resorcinol or hydroquinone may be prepared by the method described by Werner and Farenhorst, Rec. Trav. Chim. 67, 438 (1948). Other types of glycidyl ethers which are useful in compositions in accordance with our invention may be prepared by the method described in U. S. Patent No. 2,181,100 of Slagh et al.

Esters stabilized in accordance with our invention may be employed in yarn-spinning operations to make fabrics or textile materials which are valuable where subjected to heat or severe conditions, such as in electrical insulation or the like. For yarn making no plasticizer is needed.

For making sheeting or coatings the addition of some plasticizer is desirable. The proportion of plasticizer which may be used in compositions in accordance with our invention may range from 0–70 parts per 100 parts of cellulose ester. Also, by mixing 100 parts of a cellulose ester as described herein with 1–70 parts of a suitable plasticizer a plastic composition may be prepared which is useful in injection molding operation. For instance, for molding cellulose acetate butyrate having a butyryl content of 35–50% plasticizers which may be employed are dibutyl sebacate, di-2-ethyl hexyl phthalate, dibutyl phthalate, methoxyethyl stearate or, in fact, any of the plasticizers ordinarily recognized as being useful for use in plastic compositions with cellulose esters of this type. To prepare plastic compositions of cellulose acetate, such as has an acetyl content of 38.5–41% acetyl, any one of the well-known plasticizers for this purpose, such as triphenyl phosphate, cresyl diphenyl phosphate, dimethyl or diethyl phthalate or the like may be employed. The glycidyl ether will produce a stabilizing effect upon the cellulose ester when employed in any proportion but ordinarily it is desirable to use an amount of glycidyl ether in the cellulose ester composition, such that the glycidyl ether constitutes 0.1–5% thereof. Most of the desirable proportions of glycidyl ether in cellulose ester compositions will be found within that range.

The following examples illustrate compositions in accordance with our invention:

*Example 1.*—A cellulose acetate butyrate having an acetyl content of 13% and a butyryl content of 36%, a sulfur content of .002–.006% and an ash content of .01–.02% was found to be such that the sulfur therein in the form of sulfate ion was in neutralized condition. 100 parts of this cellulose ester was compounded with 5 parts of plasticizer and compositions were prepared therefrom having from 0–5% of bis (p,p diglycidoxy diphenyl) ethane therein. The following table illustrates the improvement in the compositions with the addition of the glycidyl ether thereto, both as regards color and as regards viscosity:

| Epoxide compound per 100 gms. cellulose ester | Relative Color after 1 hr. at 205° C. | Intrinsic Viscosity after 2 hrs. at 205° C. |
|---|---|---|
| 0 | 350 | 0.86 |
| 1.0 | 300 | 1.40 |
| 2.0 | 300 | 1.42 |
| 5.0 | 300 | 1.54 |

*Example 2.*—A cellulose acetate butyrate having an acetyl content of 13%, a butyryl content of 36%, an ash content of .04% and a sulfur content of .01% was found to have an ash content which was ineffective in neutralizing the sulfur acid radicals which were present. This cellulose ester when compounded with 5 parts of plasticizer per 100 parts of ester became black on heating for one hour at 205° C. and showed an intrinsic viscosity of .08 after two hours at 205° C. Compositions were then made up (1) with the glycidyl ether with the cellulose ester, (2) with aluminum formate only with the cellulose ester, and (3) with the glycidyl ether and the aluminum formate in the cellulose ester. It was found that much better stability was obtained with the cellulose ester containing the sulfur in a neutralized condition only, than when the glycidyl ether was used without that neutralization. Also, the combination showed much better viscosity properties than the ester composition in which the sulfur content of the ester had been neutralized only. The results obtained in this case are as follows:

| Parts Glycidyl Ether per 100 parts Cellulose Ester | Percent Aluminum Formate | Color after 1 hr. at 205° C. | Intrinsic Viscosity after 2 hrs. at 205° C. |
|---|---|---|---|
| 4.0 | 0 | Black | 0.08 |
| 0 | .05 | 350 | 0.38 |
| 4.0 | .05 | 300 | 0.92 |

*Example 3.*—A cellulose acetate butyrate which was low both in ash and combined sulfur was tested (1) without neutralizing salt and glycidyl ether, (2) with neutralizing salt alone, and (3) with the combination of neutralizing salt and hydroquinone diglycidyl ether. The following results were obtained:

| Parts Glycidyl Ether Added per 100 Parts Cellulose Ester | Neutralizing Salt | Color | Intrinsic Viscosity after 2 hrs. at 205° C. |
|---|---|---|---|
| 0 | 0 | Dk. Amber | .08 |
| 0 | .025 Aluminum Formate | 350 | .86 |
| 1 | do | 200 | 1.20 |
| 0 | .03% Potassium acid oxalate | 225 | .95 |
| 1 | do | 225 | 1.23 |

This shows that although the addition of neutralizing salt has some effect, the maximum stabilizing effect is obtained by the combination of the neutralizing salt and the glycidyl ether.

*Example 4.*—Three different lower fatty acid esters of cellulose were designated A, B, and C and were prepared for stabilization treatments. Samples A and C had sulfur acid radical neutralization, the neutralization in sample A having been obtained by the washing of the cellulose ester with hard water and that in sample C by treating with .03% of potassium acid oxalate during the drying of the powdered ester. Sample B had been incompletely neutralized during precipitation. The effect on the intrinsic viscosity after two hours at 205° C. was as follows:

| Sample | Parts Glycidyl Ether per 100 parts of Cellulose Ester | Intrinsic Viscosity after 2 hours at 205° C. |
|---|---|---|
| A | 0 | .98 |
| A | .5 | 1.43 |
| B | 0 | .18 |
| B | .5 | 1.23 |
| C | 0 | .94 |
| C | 1 | 1.37 |

In the test given above the color was determined in each case by comparing the samples for color with a stock solution made up as follows:

.20 g. Ciba oil soluble Yellow BB
.20 g. Calcofast Spirit Orange R
.002 g. General Dyestuffs Alizarine Cyanine Green G Ex. Conc. Color Index 1078
Made up to one liter with dimethyl phthalate The dark brown solution thus obtained is further diluted with dimethyl phthalate so that a 1:20 solution is regarded as having a color of 500, a 1:50 solution as having a color of 180, and a 1:70 solution as having a color of 150.

The intrinsic viscosity is indicative of the degree of general breakdown. A cellulose ester composition which has been degraded much below a value of 1.0 (such as .5–.7 and lower) is not useful for plastic purposes. The intrinsic viscosity is determined by measuring the flow rate of a solution of 0.25 g. of the test composition made up to 100 cc. with glacial acetic acid. A measure of the flow time itself gives relative viscosity.

$$\text{Relative viscosity } (n)_r = \frac{\text{flow time for solution}}{\text{flow time for solvent}}$$

$$\text{Intrinsic viscosity } (n) = 9.21 \log (n)_r$$

It is desirable in preparing cellulose esters for compositions in accordance with our invention that the sulfur acid radical content be kept low. The preparation of cellulose esters having a low sulfur acid radical content is described in an article by Malm, Tanghe and Laird in "Industrial and Engineering Chemistry," vol. 38, page 77, January 1946. This disclosure is to be considered as part of the present specification.

We claim:

1. A stable cellulose ester composition comprising a lower fatty acid ester of cellulose containing sulfur only in the form of sulfur acid radicals in neutralized condition and a stabilizing quantity of a gylcidyl ether containing only C, H, and O, boiling within the range of 140–385° C. and showing no decomposition at a temperature of 200° C.

2. A stable cellulose ester composition comprising a lower fatty acid ester of cellulose containing sulfur only in the form of sulfur acid radicals in neutralized condition, a plasticizer, and a stablizing quantity of a glycidyl ether containing only C, H, and O, boiling within the range of 140–385° C. and showing no decomposition at a temperature of 200° C.

3. A stable cellulose ester composition comprising a lower fatty acid ester of cellulose containing sulfur only in the form of sulfur acid radicals in neutralized condition and a stabilizing quantity of hydroquinone di glycidyl ether.

4. A stable cellulose ester composition comprising a lower fatty acid ester of cellulose containing sulfur only in the form of sulfur acid radicals in neutralized condition and a stabilizing quantity of resorcinol di glycidyl ether.

5. A plastic composition comprising 100 parts of a lower fatty acid ester of cellulose containing sulfur only in the form of sulfur acid radicals in neutralized condition, 1–70 parts of a plasticizer and a stabilizing quantity of a glycidyl ether containing only C, H, and O, boiling within the range of 140–385° C. and showing no decomposition at a temperature of 200° C.

6. A plastic composition comprising a lower fatty acid ester of cellulose containing sulfur only in the form of sulfur acid radicals in neutralized condition, 1–70 parts of a plasticizer and a stabilizing quantity of hydroquinone di glycidyl ether.

7. A stable cellulose ester composition comprising a lower fatty acid ester of cellulose to which aluminum formate has been added, a plasticizer and a stabilizing quantity of a glycidyl ether containing only C, H, and O, boiling within the range of 140–385° C. and showing no decomposition at a temperature of 200° C.

8. A stable cellulose ester composition comprising a lower fatty acid ester of cellulose to which aluminum formate has been added, a plasticizer and a stabilizing quantity of a hydroquinone di glycidyl ether.

9. A stable cellulose ester composition comprising a lower fatty acid ester of cellulose to which potassium acid oxalate has been added and a stabilizing quantity of a glycidyl ether containing only C, H, and O, boiling within the range of 140–385° and showing no decomposition at a temperature of 200° C.

10. A plastic composition comprising 100 parts of cellulose acetate butyrate having a butyryl content of 35–50% and containing sulfur only in the form of sulfur acid radicals in a neutralized condition, 1–50 parts of a plasticizer for the cellulose acetate butyrate and a stabilizing quantity of a glycidyl ether containing only C, H, and O, boiling within the range of 140–385° C. and showing no decomposition at a temperature of 200° C.

11. A method of preparing a stable cellulose ester composition which comprises adding to an unstable lower fatty acid ester of cellulose, a neutralizing agent selected from the group consisting of potassium acid oxalate, aluminum formate, sodium formate, and sodium acid fumarate, in an amount at least chemically equivalent to the unneutralized sulfur acid radicals present therein and a stabilizing quantity of a glycidyl ether containing only C, H, and O, boiling within the range of 140–385° C. and showing no decomposition at a temperature of 200° C.

12. A method of preparing a stable cellulose ester composition which comprises adding to an unstable lower fatty acid ester of cellulose, potassium acid oxalate in an amount at least chemically equivalent to the unneutralized sulfur acid radicals in the cellulose ester and a stabilizing quantity of a glycidyl ether containing only C, H, and O, boiling within the range of 140–385° C. and showing no decomposition at a temperature of 200° C.

13. A method of preparing a stable cellulose ester composition which comprises adding to an unstable lower fatty acid ester of cellulose, aluminum formate in an amount at least chemically equivalent to the unneutralized sulfur acid radicals in the cellulose ester and a stabilizing quantity of a glycidyl ether containing only C, H, and O, boiling within the range of 140–385° C. and showing no decomposition at a temperature of 200° C.

14. A stable cellulose ester composition comprising a lower fatty acid ester of cellulose to which a neutralizing agent selected from the group consisting of potassium acid oxalate, aluminum formate, sodium formate and sodium acid fumarate has been added to neutralize the sulfur acid radicals in the cellulose ester, a plasticizer and a stabilizing quantity of a glycidyl ether containing only C, H, and O, boiling within the range of 140–385° C. and showing no decomposition at a temperature of 200° C.

CARL J. MALM.
ROBERT F. WILLIAMS.

References Cited in the file of this patent

UNITED STATES PATENTS

| Number | Name | Date |
|---|---|---|
| 1,607,474 | Mork | Nov. 16, 1926 |
| 2,186,454 | Gloor | Jan. 9, 1940 |
| 2,207,702 | Straughn | July 16, 1940 |
| 2,329,705 | Dreyfus | Sept. 21, 1943 |
| 2,453,634 | Marple | Nov. 9, 1948 |
| 2,467,171 | Werner et al. | Apr. 12, 1949 |